(12) United States Patent
Ghabra et al.

(10) Patent No.: US 8,587,403 B2
(45) Date of Patent: Nov. 19, 2013

(54) METHOD AND SYSTEM OF DETERMINING AND PREVENTING RELAY ATTACK FOR PASSIVE ENTRY SYSTEM

(75) Inventors: Riad Ghabra, Dearborn Heights, MI (US); Nikolay Yakovenko, West Bloomfield, MI (US); Hilton W. Girard, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 480 days.

(21) Appl. No.: 12/643,189

(22) Filed: Dec. 21, 2009

(65) Prior Publication Data

US 2010/0321154 A1    Dec. 23, 2010

Related U.S. Application Data

(60) Provisional application No. 61/218,169, filed on Jun. 18, 2009.

(51) Int. Cl.
*G05B 19/00*    (2006.01)

(52) U.S. Cl.
USPC ....... 340/5.61; 340/10.1; 340/10.3; 340/10.4; 340/10.41; 340/426.16; 340/426.22; 340/426.29; 340/426.36; 340/426.28; 340/435; 340/904

(58) Field of Classification Search
USPC .................. 340/5.61, 10.1, 10.3, 10.4, 10.41, 340/426.16, 426.22, 426.29, 426.36, 340/426.28, 435, 904
See application file for complete search history.

(56) References Cited

U.S. PATENT DOCUMENTS

| | | | | |
|---|---|---|---|---|
| 6,034,593 A * | 3/2000 | Chase et al. | | 340/426.36 |
| 6,218,932 B1 * | 4/2001 | Stippler | | 340/426.16 |
| 6,538,560 B1 * | 3/2003 | Stobbe et al. | | 340/5.72 |
| 6,563,474 B2 * | 5/2003 | Nantz et al. | | 343/788 |
| 6,570,486 B1 * | 5/2003 | Simon et al. | | 340/5.1 |
| 6,617,961 B1 * | 9/2003 | Janssen et al. | | 340/5.8 |
| 6,650,404 B1 * | 11/2003 | Crawford | | 356/5.01 |
| 6,747,545 B2 * | 6/2004 | Nowottnick et al. | | 340/5.61 |
| 6,850,148 B2 * | 2/2005 | Masudaya | | 340/5.61 |
| 6,960,981 B2 * | 11/2005 | Blatz | | 340/5.61 |
| 6,970,679 B2 * | 11/2005 | Blatz et al. | | 455/41.1 |
| 6,992,568 B2 * | 1/2006 | Perraud et al. | | 340/10.3 |

(Continued)

FOREIGN PATENT DOCUMENTS

DE    102005058041 A1    6/2007
EP    1288841 A1 *    3/2003

(Continued)

OTHER PUBLICATIONS

Alrabady et al., "Some Attacks Against Vehicles' Passive Entry Security Systems and Their Solutions", IEEE Transactions on Vehicular Technology, vol. 52, No. 2, Mar. 2003, pp. 431-439.

(Continued)

*Primary Examiner* — George Bugg
*Assistant Examiner* — Paul Obiniyi
(74) *Attorney, Agent, or Firm* — Brooks Kushman P.C.

(57) ABSTRACT

A system and method for preventing relay attack on a passive entry system (PES) or other passive system (PS) included within a vehicle or other entity. The relay attack prevention may be based in part on an assessment of whether the fob is able to distinguish signal strength relative to messages communicated form different antennas within the vehicle and/or amongst different signal amplitude communicated from the same antenna.

20 Claims, 5 Drawing Sheets

(56) References Cited

U.S. PATENT DOCUMENTS

| | | | |
|---|---|---|---|
| 6,995,653 B2* | 2/2006 | Takahashi et al. | 340/5.71 |
| 7,034,656 B2* | 4/2006 | Buchner | 340/5.61 |
| 7,292,134 B2* | 11/2007 | Conner et al. | 340/5.64 |
| 7,301,467 B2* | 11/2007 | Ishimura et al. | 340/644 |
| 7,369,040 B2* | 5/2008 | Baumgartner et al. | 340/426.36 |
| 7,466,219 B2* | 12/2008 | Ishimura et al. | 340/435 |
| 7,629,875 B2* | 12/2009 | Baumgartner et al. | 340/426.13 |
| 7,792,514 B2* | 9/2010 | Meltzer et al. | 455/334 |
| 7,796,965 B2* | 9/2010 | Moser et al. | 455/226.2 |
| RE41,843 E * | 10/2010 | Blatz et al. | 455/41.1 |
| 7,843,257 B2* | 11/2010 | Jones et al. | 327/553 |
| 7,859,389 B2* | 12/2010 | Baumgartner et al. | 340/426.36 |
| 7,868,745 B2* | 1/2011 | Schmidt et al. | 340/426.16 |
| 7,920,051 B2* | 4/2011 | Watanabe et al. | 340/10.41 |
| 7,928,829 B2* | 4/2011 | Hermann | 340/5.72 |
| 8,009,023 B2* | 8/2011 | Bergerhoff et al. | 340/426.22 |
| 8,035,483 B2* | 10/2011 | Song et al. | 340/10.1 |
| 2001/0033222 A1* | 10/2001 | Nowottnick et al. | 340/5.61 |
| 2003/0001723 A1* | 1/2003 | Masudaya | 340/5.61 |
| 2003/0043023 A1* | 3/2003 | Perraud et al. | 340/10.1 |
| 2003/0098811 A1* | 5/2003 | Nikolai et al. | 342/458 |
| 2004/0032363 A1* | 2/2004 | Schantz et al. | 342/127 |
| 2005/0024181 A1* | 2/2005 | Hofbeck et al. | 340/5.7 |
| 2005/0046546 A1* | 3/2005 | Masudaya | 340/5.61 |
| 2005/0046608 A1* | 3/2005 | Schantz et al. | 342/127 |
| 2006/0044181 A1* | 3/2006 | Wilcox | 342/118 |
| 2006/0077042 A1* | 4/2006 | Hock | 340/10.4 |
| 2006/0083406 A1* | 4/2006 | Ishimura et al. | 382/106 |
| 2006/0094350 A1* | 5/2006 | Ishimura et al. | 455/9 |
| 2006/0208854 A1* | 9/2006 | Baumgartner et al. | 340/5.61 |
| 2006/0267744 A1* | 11/2006 | Baumgartner et al. | 340/426.36 |
| 2006/0273888 A1* | 12/2006 | Yamamoto | 340/426.36 |
| 2007/0008088 A1* | 1/2007 | Nantz et al. | 340/426.29 |
| 2007/0030118 A1* | 2/2007 | Nowottnick | 340/5.61 |
| 2007/0109093 A1* | 5/2007 | Matsubara et al. | 340/5.61 |
| 2008/0024322 A1* | 1/2008 | Riemschneider et al. | 340/904 |
| 2008/0055091 A1* | 3/2008 | Song et al. | 340/572.5 |
| 2008/0143500 A1 | 6/2008 | Ghabra et al. | |
| 2008/0246603 A1* | 10/2008 | Mutou | 340/539.13 |
| 2008/0252422 A1* | 10/2008 | Dowla et al. | 340/10.1 |
| 2008/0305760 A1* | 12/2008 | Meltzer et al. | 455/334 |
| 2009/0206989 A1* | 8/2009 | Leitch | 340/5.61 |
| 2010/0026557 A1* | 2/2010 | Wilcox | 342/118 |
| 2010/0066561 A1* | 3/2010 | Ulrich et al. | 340/870.07 |
| 2010/0160004 A1* | 6/2010 | Alameh et al. | 455/575.1 |
| 2010/0173582 A1* | 7/2010 | Han | 455/41.1 |
| 2010/0219883 A1* | 9/2010 | Jones et al. | 327/553 |

FOREIGN PATENT DOCUMENTS

| | | |
|---|---|---|
| FR | 2889831 A1 | 2/2007 |
| GB | 2444819 A | 6/2008 |
| WO | 0125060 A2 | 4/2001 |
| WO | 2006035361 A1 | 4/2006 |
| WO | 2006059296 A3 | 6/2006 |
| WO | 2006128900 A1 | 12/2006 |

OTHER PUBLICATIONS

Great Britain Search and Examination Report for corresponding Application No. GB1009218.7, mailed Sep. 30, 2010, 7 pages.
Great Britain Search and Examination Report for Application No. GB1009218.7, mailed Oct. 21, 2011, 3 pages.
Office Action dated Jun. 28, 2013 from corresponding German Patent Application No. 102010028039.9, Filed on Apr. 21, 2010 and Published on Dec. 23, 2010, 5 pp.

* cited by examiner

METHOD AND SYSTEM OF DETERMINING AND PREVENTING RELAY ATTACK FOR PASSIVE ENTRY SYSTEM

CROSS-REFERENCE TO RELATED APPLICATIONS

This application claims the benefit of U.S. provisional application Ser. No. 61/218,169 filed Jun. 18, 2009.

BACKGROUND OF THE INVENTION

1. Technical Field

The present invention relates to methods and systems of preventing relay attacks of the type where signals are relayed from one device to another device in a manner that deceives a transmitting entity of the proximity of a device intended to receive the relayed signals.

2. Background

A relay attack is an attack on a wireless communication system where signals are relayed from one device to another device in a manner that deceives a transmitting entity of the proximity of a device intended to receive the relayed signals. A passive entry system (PES) used to facilitate access to a vehicle is one type of wireless communication system that is susceptible to a relay attack. The PES is configured to automatically allow vehicle entry, and in some cases, vehicle start as a long as a fob authorized by a PES controller within the vehicle is within a certain proximity.

Thieves have developed a system that initially relays the PES signals a greater distance away from the vehicle to an unsuspecting fob and then relays the fob's response back to the vehicle as if the fob was in close proximity. Since the fob is configured to respond to any messages received from the PES controller, even if the message was relayed to the fob with a relay attack system, the fob will respond in kind. In some cases, the fob may have a transmission range that allows its response to reach the vehicle without having to be relayed by the thieves. Thinking the fob must be within the required proximity in order to respond to the PES signals, the PES controller may unlock or start the vehicle upon receipt of the relayed response of the fob.

Some PES systems may include random numbers, high-level encryption, and rolling codes within the PES message in an effort to counteract the relay systems. These measures may make it a difficult for a relay system to relay message in correspondence with the vehicle PES controller rapidly changing the numbers and encryption requirements. These measures have been counteracted at least to some extent with newer relay attack systems having more sophisticated capabilities. Some PES system may included time of flight (TOF) and other temporal based scenarios to gauge time delays associated with the signaling relay employed by a relay attack system relaying the PES signals beyond the desired proximity to the vehicle. Such systems, however, can be problematic since they require acute temporal accuracy in order to properly measure TOF.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
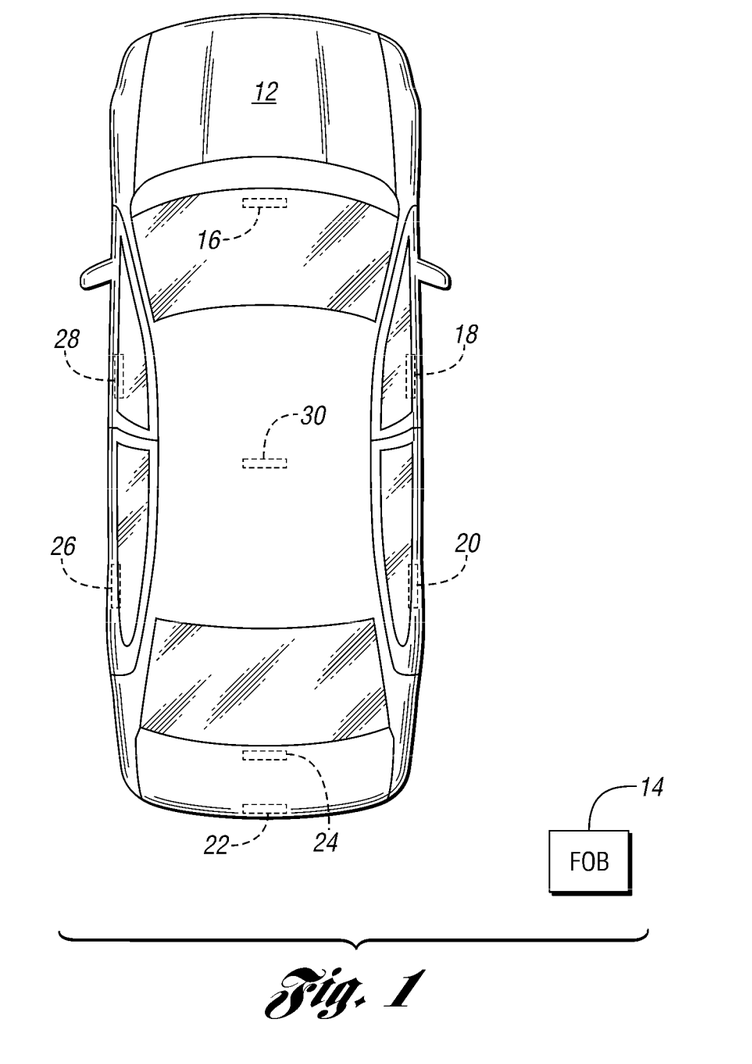
FIG. 1 illustrates a system for determining and preventing relay attack in accordance with one non-limiting aspect of the present invention.

FIG. 1 illustrates a system 10 for determining and preventing relay attack in accordance with one non-limiting aspect of the present invention. The system 10 is predominately described with respect to preventing relay attack of a vehicle passive entry system (PES) included within a vehicle to passively control one or more vehicle systems. The present invention, unless otherwise noted, is not necessarily limited to only preventing relay attack on vehicle PES and may be similarly used to thwart relay attacks on any system susceptible to attacks where access may be gained by simply relaying signals from one device to another device in an effort to deceive a transmitting entity of the proximity of a device intended to receive the relayed signals, such as but not limited to home security systems, commercial building badge access systems, etc.

The system 10 of the present invention contemplates a vehicle having a PES controller 12 configured to passively control one or more vehicle systems according to signals received from a fob 14. The PES controller 12 may be a standalone controller or other logically executing feature included within the vehicle having capabilities to support one or more of the operations contemplated by the present invention. The PES controller 12 may be configured in accordance with the present invention to perform passive operations commonly performed within vehicles and to do so in manner that thwarts, if not prevents, relay attacks. To this end, the vehicle may include a number of PES antennas 16, 18, 20, 22, 26, 28, 30 positioned within strategic areas of the vehicle to support various PES related operations. The PES antennas 16, 18, 20, 22, 26, 28, 30 may be low frequency (LF) antennas in comparison to an ultra high frequency (UHF) antenna (not shown) included within the fob 14.

Figure 2:
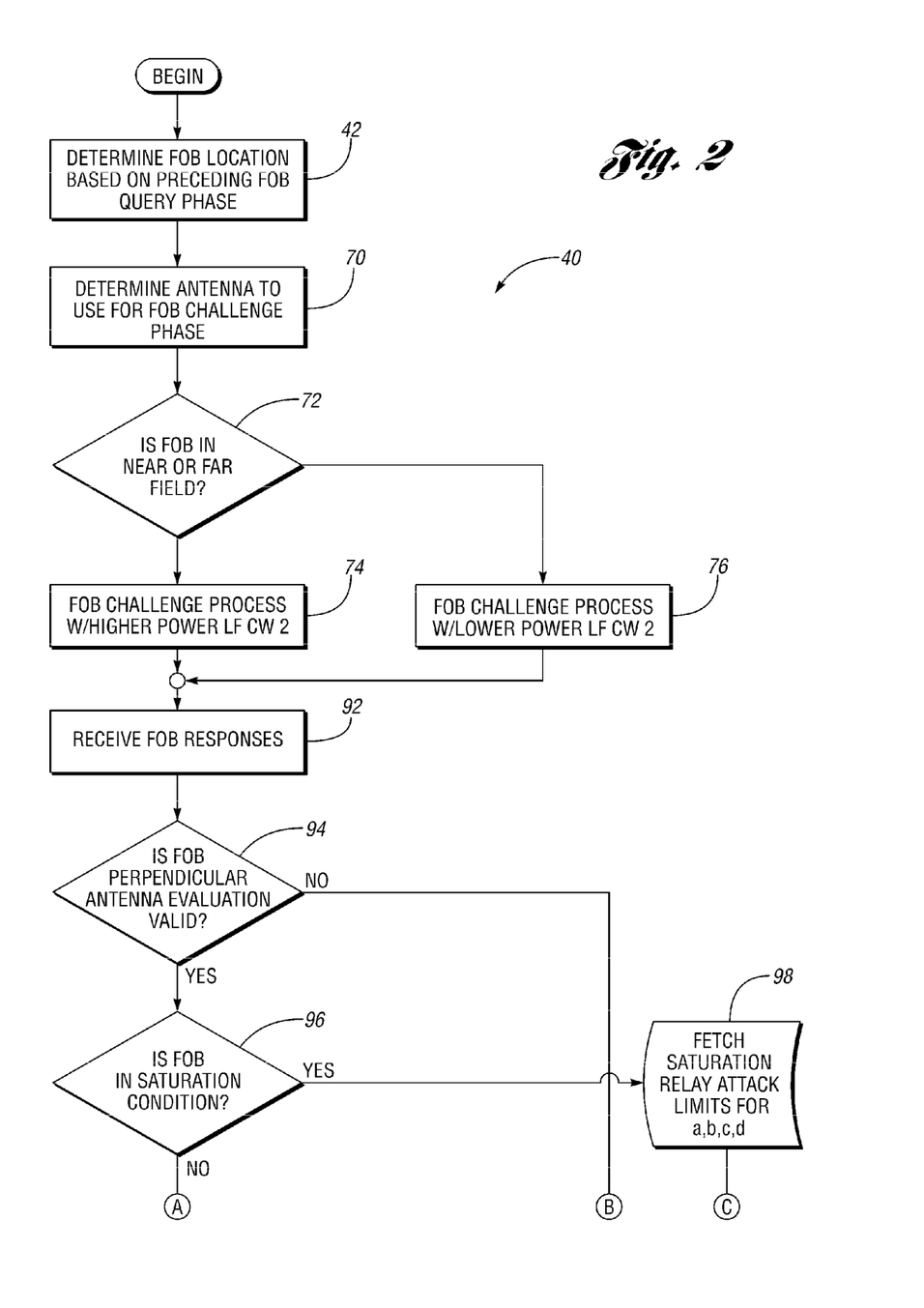
FIG. 2 illustrates a flowchart of method of preventing relay attack in accordance with one non-limiting aspect of the present invention.

FIG. 2 illustrates a flowchart 40 of method of preventing relay attack in accordance with one non-limiting aspect of the present invention. While the flowchart is illustrated with a number of sequential steps, one or more steps may be omitted and/or executed in another manner without deviating from the scope and contemplation of the present invention. The method generally relates to assessing a distance of the fob 14 to the vehicle and granting passive access/control of one or more of the vehicle systems according to the distance of the fob 14. The method may include the application of one or more tests developed to assess the authentication of the fob 14 in accordance with its distance and positioning relative to the vehicle.

The method begins in Block 42 with determining a location of the fob 14 based on query signals previously transmitted to the fob by the PES controller 12 as part of PES triggering event. For example, the PES controller 12 may transmit the query signals upon actuation of a door handle, such as when a thief lifts the door handle in order to instigate an unlock operation of a door/trunk/liftgate/liftgate window, upon actuation of a vehicle start button should the thief enter an unlocked car and try to start the vehicle, and/or upon determining an error or other interrupt with previously established fob communications, such as if communication used to support a previously authenticated passive event were lost before the conclusion of the event.

The PES triggering event may prompt the PES controller 12 to issue one or more query messages in accordance with the particular system desired to be passively controlled. This may include, for example, transmitting the query messages from antennas 16, 18, 20, 22, 26, 28, 30 associated with the desired operation, i.e., those associated with passive start, passive entry (unlock), and passive stowage (trunk access) for example. For passive start, antennas 16, 28, 30 may be used to proximate the location of the fob 14 relative to the two antennas included within the vehicle (16 and 30) and the antenna included on the door 20 of the vehicle. For passive entry, the antenna (i.e. 18, 20, 26, 28 on the door corresponding with the lifted door handle may transmit with the two other antennas that best support triangulation with that door. For passive stowage, antennas 23, 24 and 26 may be used to proximate the location of the fob relative to the rear of the vehicle.

For each of the any number of possible PES triggering events, any number of query messages may be transmitted from any number of antennas 16, 18, 20, 22, 26, 28, 30 depending on the trigger event and a suitable antenna configuration need to approximate triangulate the position of the fob. For exemplary purposes the present invention contemplates one non-limiting arrangement where three query messages are separately transmitted from three antennas 16, 18, 20, 22, 26, 28, 30 likely to be the closest and to support triangulation with the fob 14 given the location the fob 14 would likely be considering the particular triggering event.

Figure 3:
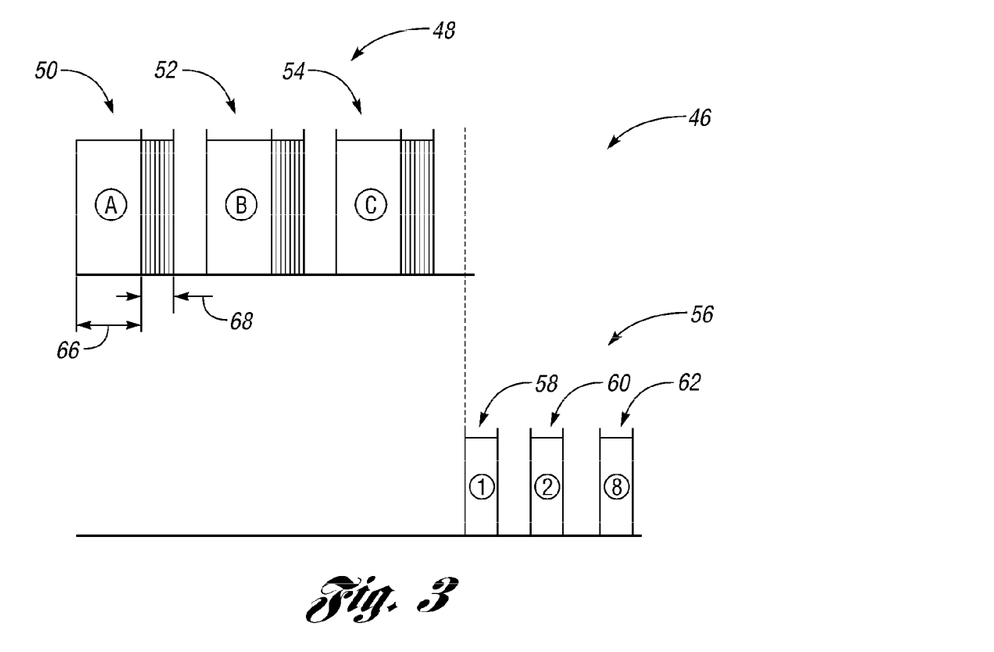
FIGS. 3-4 illustrate a query stage in accordance with one non-limiting aspect of the present invention.

FIG. 3 illustrates at timeline 46 of message communications that may take place in response to a trigger event. The timeline 46 may include a first query portion 48 where the PES controller 12 selects three antennas 16, 18, 20, 22, 26, 28, 30 to issue query messages 50, 52, 54 and a second response portion 56 where the fob 14 responds to each message with a corresponding response message 58, 60, 62, if received. The query messages 50, 52, 54 may be sequentially transmitted from multiple antennas 16, 18, 20, 22, 26, 28, 30 with a slight gap between each transmission to facilitate triangulating a location of the fob 14 and the responses 58, 60, 62 of the fob 14 to each message may be similarly space apart. The query messages 50, 52, 54 may include requests for information and other commands depending on the particular operation to be passively controlled.

In accordance with one non-limiting aspect of the present invention, the query messages 50, 52, 54 may include a data portion 66 and a non-data portion 68. The data portion 66 may include the information requests and other commands and the non-data portion 68 may include a continuous wave (CW) portion/signal. The CW portion may be used to provide a signal having a constant amplitude and frequency to facilitate assessment of the signals being received by the fob 14. The CW portion 68 may naturally attenuate with distance traveled such that its amplitude decreases as it travels further form the vehicle. The data portion 66 may be transmitted with instructions to alert the fob 14 as to the content of the information to be included in the messages 58, 60, 62 and any related operations, such as but not limited to including a request for the fob 14 to measure or otherwise record a value related to the CW portion 68 of each signal.

Figure 4:
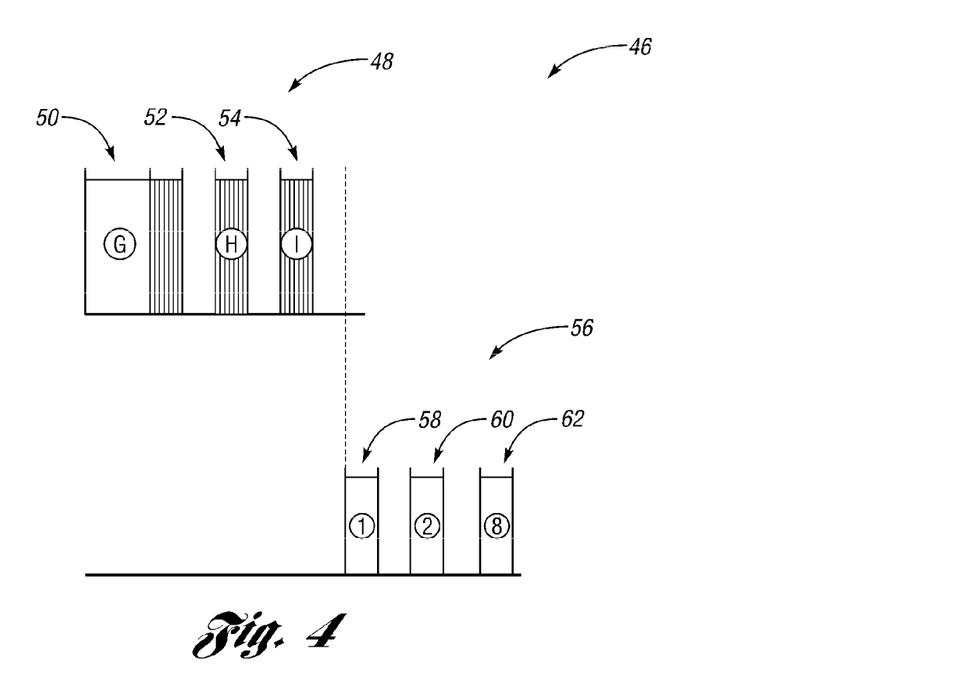

As shown in FIG. 4, some of the first stage messages 52, 54 may not include the data portion 66 if a preceding message(s) 50 includes sufficient instructions for the fob 14. In some cases, each data portion 66 includes encryption and other security measures that require processing by the fob 14. In the event sufficient security is provided by the data transmitted in one of the messages 58, 60, 62, the related security may be eliminated from the other messages 58, 60, 62 in order to limit processing demands on the fob 14. The messages 58, 60, 62 transmitted in the first stage may include sufficient instructions, in one or more of the messages 16, 18, 20, 22, 26, 28, 30, to instruct the fob 14 to generate a representation of each CW signal.

The fob 14 may include a 3-axis coil antenna (not shown) to facilitate communications with the PES controller 12. The three coils may be arranged such that currents sensed on each coil may be averaged and used to facilitate receipt of the PES signals. Additionally, currents received on each axis may be average together to sample the illustrated amplitude representations. The fob 14 may also calculate other information regarding the received PES messages, such as per axis current differences for each of the messages 50, 52, 54, i.e., the fob may compare the axial currents on each of the three axes for each message to determine a direction to the vehicle based on an expected axial difference for an identified position of the transmitting antennas within the vehicle (position may be known ahead of time or identified within the data portions of the first stage). Of course, the fob 14 may be instructed to perform any number of other computations on the signal received in the first stage.

The amplitude values and other information optionally determined by the fob 14 in response to the query messages may be transmitted by the fob 14 in the responsive messages 58, 60, 62 of the second stage 56. Once this information is received from the fob 14, the method continues in Block 70 with a determination of a 'best' antenna of the three transmitting antennas 16, 18, 20, 22, 26, 28, 30 to be used in a challenge phase where the PES controller 12 transmits a challenge query to the fob 14 as apart of the process for determining the likelihood of a relay attack. The 'best' or preferred antenna 16, 18, 20, 22, 26, 28, 30 may be determined to be the antenna 16, 18, 20, 22, 26, 28, 30 closet to the fob 14 as indicated from the information included in the response messages 58, 60, 62 received from the fob 14. The determination may be calculated by the fob 14 and/or the PES controller 12.

These one or more responsive messages 58, 60, 62 may then be used in Block 72 to determine whether the fob 14 is near field or far field. This parameter may be based on a saturation point of the fob antenna relative to a transmitting range of the vehicle antennas 16, 18, 20, 22, 26, 28, 30. If each vehicle antenna 16, 18, 20, 22, 26, 28, 30 transits signals at approximately the same signal strength for each transmission, i.e., the same amplitude CW, depending on the position of the fob 14 to the vehicle, the fob antenna may be saturated if it is too close to the vehicle and it may not saturated if it is at some farther distance from the vehicle. One measure of whether the fob 14 is near field or far field may be based on whether the fob 14 can sense an amplitude increase relative the CW amplitude transmitted during the query stage 48. If the fob 14 can sense an amplitude variance in a subsequent signal having a greater amplitude, then the fob 14 may be considered to be far field, and if it cannot, then the fob may be considered to be near field.

Figure 5:
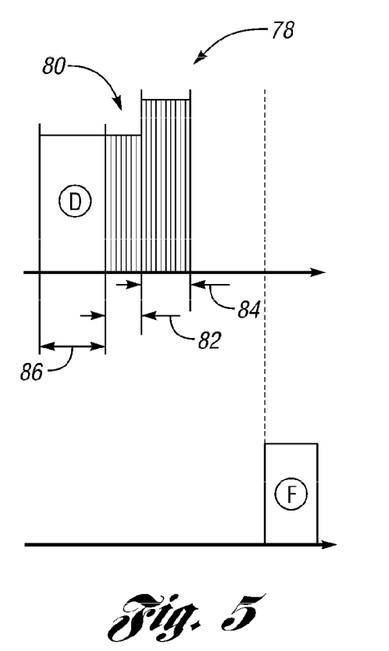
FIG. 5 illustrates a far field challenge test in accordance with one non-limiting aspect of the present invention.

Block 72 sets a far field flag in the event the fob 14 is considered to be sufficiently far away from the vehicle to be considered as far field. FIG. 5 illustrates a far field challenge test in accordance with one non-limiting aspect of the present invention. Following that in Blocks 74, 76, a far field test may be issued as part of a challenge query stage 78 where a challenge message query 80 is issued with a first CW portion 82 and a second CW portion 84, the second CW portion 84 being greater than the first 82. This may include transmitting the challenge query 80 from the 'best' antenna and receiving a second response message 88 from the fob 14. The challenge message 80 may be similar to the messages 50, 52, 54 in the first stage 48 where a portion 86 of the message 80 includes data instructs the fob 14 to take certain action and a portion 82, 84 includes first and second CW signals (CW1 and CW2).

Figure 6:
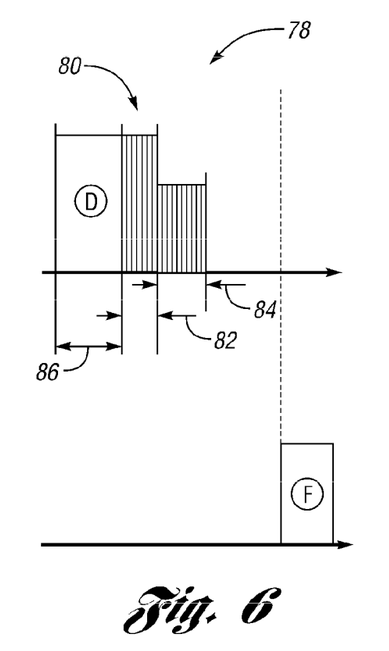
FIG. 6 illustrates a near field challenge test in accordance with one non-limiting aspect of the present invention.

The far field test illustrates the second CW portion 84 being greater than the first CW portion 82. The degree of offset may be determine according to the sensitivity of the fob antenna and/or the perceived distance of the fob 14 from the vehicle as determined form the information included in the first response. FIG. 6 illustrates a near field challenge test in accordance with one non-limiting aspect of the present invention. The near field test illustrates the second CW portion 84 being less than the first CW portion 82 in proportion to the sensitivity of the fob antenna and/or the perceived distance of the fob 14 from the vehicle as determined form the information included in the first response.

The CW signals 82, 84 may be separated into the noted first and second amplitudes in order for the fob 14 to determine a difference in amplitude itself or for the PES controller 12 to calculate the difference from different readings provided within the second response. The amplitude difference can then be transmitted to the PES controller 12 in the response message sent from the fob 14 in Block 92. If the fob's response fails to indicate difference in amplitude that is sufficiently close to the difference in amplitude between the CW1 and CW2 signals, a relay attack scenario may be possible. This methodology may be based on an assumption that a relay attack system would be unable to repeat/relay the CW1 and CW2 amplitude various.

The level of security may be an acceptable risk relative the cost and sophistication required to support TOF or encryption analysis techniques. Of course, those techniques could be used in combination with the foregoing if desired to provide a more robust relay attack defense. If the relay attack system simply re-transmits the data include in the challenge stage message 80, and not the CW amplitude differences, a relay attack could be deemed possible if the fob's response fails to identify an amplitude difference. This strategy may not be conclusive since it is possible that the fob's coils could be saturated or close to saturation such that the fob's response fails to indicate the desired amplitude difference.

Figure 7:
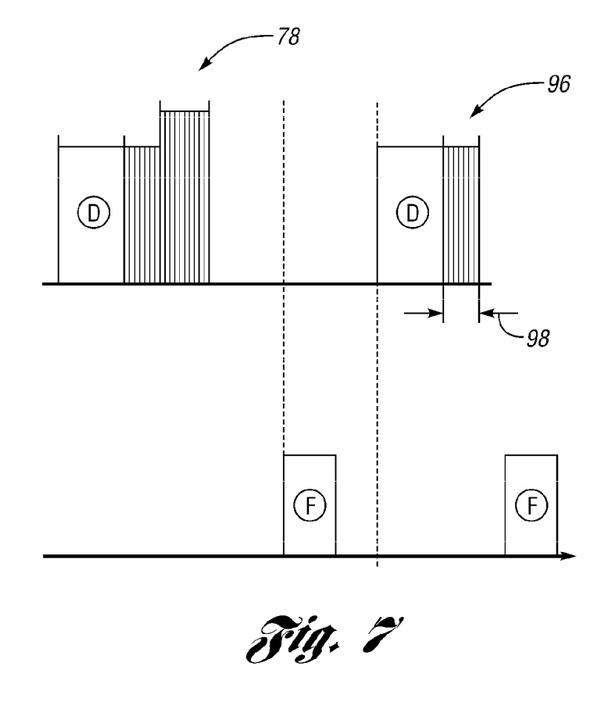
FIG. 7 illustrates a perpendicularity test in accordance with one non-limiting aspect of the present invention.

Optionally, a perpendicularity test may be issued in Block 94 to further test for the presence of a relay attack. This may include the PES controller 12 issuing a perpendicularity query 96 to the fob 14. FIG. 7 illustrates issuance of such a query upon receipt of the second response 88 of the fob 14 to the challenge query 80. The perpendicularity query 96 may request the fob 14 to assess its perpendicularity relative to a CW3 signal included with a non-data portion 98 transmitted from another one of the vehicle antennas that is perpendicular (or other sufficient angle) to the 'best' antenna used to transmit the CW1 and CW2 signals.

The perpendicular evaluation may be used to assess whether the fob is positioned within an expected location based on difference in amplitude between the CW1 and CW3 signals as sensed on the 3-axis coils of the fob. More specifically, depending on the angular relation of the antenna 16, 18, 20, 22, 26, 28, 30 transmitting the CW3 signal relative to the 'best' antenna, the fob 14 would be expected to sense a particular current pattern across the 3-axis coils for each of the CW1 and CW3 signals. If this pattern is not reflected in the fob's response, then it may indicate a relay attack possibility since a relay attack system may be unable to relay the amplitude changes associated with the perpendicular spatial relation of the antennas 16, 18, 20, 22, 26, 28, 30 to the vehicle. The CW3 signal used during the near field process may be less than the CW3 signal used during the far field process in order to limit the likelihood of saturation.

The perpendicularity evaluation can be used in combination with the amplitude variance inquiry to further refine relay attack assessment. While it may be possible for both of the related signaling to saturate the fob's coils, the likelihood of both tests resulting in saturation during a non-relay attack scenario may be sufficiently low to consider a relay attack in the event that the combined responses fail to indicate the desired amplitude variations. The perpendicularity test may be passed in the event the information sent from the fob 14 indicates a current pattern within the 3-axis coils that is representative of the pattern expect to be seen through the coils in the absence of a relay attack. There may be a possibility, however, that the fob 14 was very close to or on a boarder dividing the near field from the far field such that the subsequent challenge messages reached the fob 14 after moving into the near field. As such, a saturation test in Block 96 may be made to reduce the likelihood of saturation disrupting evaluation.

This saturation testing may include an assessment of the query stage measurements taken by the fob 14 for each of the messages 50, 52, 54 associated with the non-'best' antennas, i.e., the two of the three antennas transmitting the first stage messages 50, 52, 54 that were not used to transmit the CW1 and CW2 signals during the challenge stage. Because of antenna 16, 18, 20, 22, 26, 28, 30 positioning within the vehicle and their limited transmission range, the fob 14 should only measure slight amplitudes, if any, from the secondary antennas. If the fob is near field, however, inherent cross-coupling of radiation from adjacent antenna wires and the close proximity may cause the signals to appear stronger than normal. As such, Blocks 98, 100, 102 may include quantifying the amplitudes values of the secondary antennas as X and Y.

The saturation condition, as noted above, could occur in either one of the near field or far field conditions (far field could occur even if the fob does not traverse the far field to near field boundary). If a saturation condition is determined, a determination is made as to whether the X or Y values are within an acceptable range. The X and Y value represent amplitude values respectively read from the two secondary antennas. These values would likely be less than saturation as long as the signals were not being relayed in a relay attack, in which case the relaying would cause the signal values to be too strong. As such, a relay attack is determined if at least one of the values is out of range and a valid transmission is determined if both values are within range. Optionally, the lower range value may be omitted.

If the saturation condition is not determined, a conclusion to the near field and far field assessment made above is determined Block 104. This assessment may occur in the illustrated manner after the perpendicularity and saturation test so that its conclusion is reached after the others. As long as the appropriate amplitude variance is determined in Blocks 106, 108, the transmission is deemed valid in Block 110, otherwise a relay attack is determined in Block 112. Once the PES controller 12 receives the desired information from the fob, and performs one or more of the test noted above, it may determine whether the fob is able to passively control the desired vehicle system.

As supported above, one non-limiting aspect of the present invention relates to a passive entry system. The system may require that a battery operated RF wireless Fob be placed on or near a person who is attempting to gain entry into a locked vehicle such that the locked vehicle contains a fixed primary controller for the passive entry system. The passive entry system may be mated with the Fob security device for the exchanging of private security keys and other information. Multiple Fobs can be mated to the system in the case of multiple users. The Fob may contain two-way radio circuits to communicate with the passive entry system. Data to the Fob may be received via short-range LF, where data from the Fob may be transmitted via long-range UHF. The UHF circuit may contain multiple UHF channels which can be selected to insure clearest communication.

When the passive entry system is activated during an attempt to gain entry by physically pulling an access handle, a successful authorization process may incur that involves wireless communication to a Fob. As part of the authorization process, the passive entry system may expect the Fob to be physically located in the expected zone to gain entry into the specific access point. The Fob's location may be determined by the passive entry system using an initial communication query phase by first transmitting three LF data bursts on three different antennas that are amongst others strategically located on the vehicle. All Fobs receive these LF bursts in discrete time steps. As the bursts are received, their signal amplitudes may be sampled. These signal amplitudes may be immediately transmitted by the Fobs back to the passive entry system via a single UHF data burst within discrete time frames per Fob to prevent collisions. The Fob's positions can then be evaluated by the passive entry system using, for one, a triangulation method which compares the received signal amplitudes against previously programmed criteria. The criteria may be empirically determined beforehand to create authorization zone boundaries comprised of defined inclusion and exclusion areas based on combinations of at most three absolute signal amplitude thresholds. When a Fob is determined to be included in the defined authorization zone, it may be confirmed with a secondary communication phase using a challenge/response protocol to explicitly validate the security credentials.

Since the communication to the Fob is radio based, there may be a possibility that the radio signals can be recorded and then re-transmitted at will. There are security measures in place that prevent acceptance of simple re-transmission, such as random numbers, high-level encryption and rolling codes. These countermeasures may make it virtually impossible to predict the next expected transmission pattern. The possibility does exists, though, that such a smart device could exist and if it did, it would be impractical as the physical locations of the transmitting antennas plays a significant role in the countermeasures as described herein. A second form of security risk may involve the relaying of the LF and UHF transmissions over greater than normal distances. This form of attack is called relay attack, where the short range LF signals are received by a relay device and re-transmitted over greater distances to another transmitter/receiver, which then re-transmits the faux copy of original LF signal to a nearby unsuspecting Fob. The Fob's long range UHF transmissions can be captured and re-transmitted in a similar fashion if required. Otherwise, the long range UHF transmission may itself be sufficiently powerful to reach the passive entry system alone. This relay process may occur in real-time to make it appear to the passive entry system that the Fob is physically in the authorization zone, when in fact it is not. One non-limiting aspect of the present invention may be used to provide countermeasures to prevent such an attack.

To prevent a relay attack, a variance between two discrete LF CW bursts during normal LF data transmission may create a measurable and detectable difference in signal amplitude for discrimination between legitimate and counterfeit signals. A defined threshold may be established for the relative proximity from the transmitting source to determine the type of signal amplitude variance. The transmitting variance may be greater for far field distances to insure a better signal to noise ratio. Conversely, the transmitting signal amplitude variance may be lower for the near field distance to prevent saturation conditions.

During signal amplitude evaluation, a special conditional may be implemented to validate extreme close proximity where it is impossible to measure the signal amplitude variance due to saturation conditions. In such a circumstance, there must be some detectable signals from the two remaining antennas not used for the challenge phase. The signals may be sampled from the preceding Fob query phase. These signals may be the result of inherent cross-coupling of LF radiation from adjacent antenna wires and, due to the close proximity, will appear much stronger than normal signal amplitudes at the normal operating distance. The signal levels may be required to fall within a predetermined acceptance window to be considered legitimate.

An additional type of evaluation may be performed within the Fob itself. During certain types of protocols, different antennas may be utilized to transmit a third LF CW burst. This additional antenna may be intended to be physically perpendicular to the antenna that transmits the first two LF CW bursts. Because the Fob uses a 3-axis LF antenna, it can analyze and determine which current axis has the strongest signal for the first two LF CW bursts. Since the third LF CW burst may be transmitted from a different and physically perpendicular antenna, consequently, it can be assumed which axis the third burst can be expected from. If the third LF CW burst is measured strongest on the expected axis, it may be considered to be legitimate. This information may be transmitted back to the passive entry system within the normal data responses to be used for further rejection or acceptance. The algorithm for evaluation may be as follows:

$$A = (LF\ CW1\ \text{amplitude on Axis 1}/LF\ CW2\ \text{amplitude on Axis 1})$$

$$B = (LF\ CW1\ \text{amplitude on Axis 2}/LF\ CW2\ \text{amplitude on Axis 2})$$

$$C = (LF\ CW1\ \text{amplitude on Axis 3}/LF\ CW2\ \text{amplitude on Axis 3})$$

$$K = \%\ \text{calibration constant}$$

IF (abs(A−B)<=K) AND (abs(B−C)<=K) AND (abs(A−C)<=K) THEN Not legitimate ELSE Legitimate END.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of preventing relay attack of a passive entry system (PES) used within a vehicle to provide passive access to one or more vehicle systems, the method comprising:
   upon detecting a PES triggering event, transmitting a query message from one or more PES antennas included within the vehicle, each of the query messages including a continuous wave (CW) portion having an amplitude that decreases as the query message travels farther from the transmitting PES antenna;
   receiving a first response of a fob receiving one or more of the query messages, the response indicating the amplitude of each CW portion included within the one or more query messages being responded to by the fob;
   determining whether the fob is one of near field and far field from the vehicle based on the amplitude included in the response indicating a distance of the fob from the vehicle to correspond with one of the near field and the far field;
   transmitting a challenge query to the fob that is dependent on whether the fob is near field or far field, the challenge query providing a first test if the fob is near field and a second test if the fob is far field; and
   granting access to the one or more vehicle systems to be passively controlled according to the PES triggering event depending at least in part on a second response of the fob to the one of the first test and the second test provided by the challenge query.

2. The method of claim 1 further comprising transmitting the challenge query to include a first CW portion and a second CW portion wherein an amplitude of the second CW portion is selected to be less than the first CW portion in the event the first test is provided and greater than the first CW portion in the event the second test is provided.

3. The method of claim 2 further comprising granting access to the one or more vehicle systems if the fob properly responds to the challenge query, the fob being considered as properly responding to the challenge query in the event the second response indicates the amplitude difference between the first CW portion and the second CW portion dictated by the challenge query.

4. The method of claim 3 further comprising issuing a perpendicularity test to the fob after the fob properly responds to the challenge query and before granting access to the one or more vehicle systems.

5. The method of claim 4 further comprising issuing the perpendicularity test by transmitting a perpendicular query message to the fob from one of the PES antennas determined to be the most perpendicular to the fob based on the first response; and granting access to the one or more vehicle systems after determining the fob to pass the perpendicularity test, the fob passing the perpendicularity test in the event a third response of the fob to the perpendicular query message indicates a current pattern for an antenna of the fob that is consistent with the fob being perpendicular to the vehicle.

6. The method of claim 3 further comprising issuing a saturation test to the fob after the fob properly responds to the challenge query and before granting access to the one or more vehicle systems.

7. The method of claim 6 further comprising granting access to the one or more vehicle systems after determining the fob passes the saturation test, the fob passing the saturation test in the event amplitudes specified in the first response for each responded to query message, other than the query message transmitted from the PES antenna closest to the fob, indicates amplitudes below a saturation level of an antenna of the fob used to receive the query messages.

8. The method of claim 7 further comprising determining the amplitudes to be below the saturation level if the amplitudes are within a specified amplitude range.

9. A method of preventing relay attack of a passive entry system (PES) used within a vehicle to provide passive access to one or more vehicle systems, the method comprising:
   executing an amplitude differentiation test, a perpendicularity test, and a saturation test in response to detection of a passive entry event, each of the tests evaluating a response of a fob to one or more messages wirelessly issued from a controller within the vehicle; and
   granting passive control of one or more vehicle systems upon successful completion of each of the amplitude differentiation test, the perpendicularity test and the saturation test.

10. The method of claim 9 further comprising determining successful completion of the amplitude differentiation test in the event the fob is able to distinguish between portion of a message having signals of a first amplitude and signal of a second amplitude.

11. The method of claim 10 further comprising selecting the second amplitude to be greater than first amplitude if a prior response from the fob indicates the fob to be far field and selecting the second amplitude to be less than the first amplitude if the prior response from the fob indicates the fob to be near field.

12. The method of claim 11 further comprising determining the prior response from one or more messages communicated from the fob in response to receipt of one or more query messages sent from the vehicle upon detection of a PES trigger event.

13. The method of claim 12 further comprising transmitting no more than three query messages to the fob in response to the PES triggering event, wherein one query message is transmitted from three different PES antennas selected from a greater number of PES antennas included with the vehicle depending on a type of the trigger event.

14. The method of claim 9 further comprising determining successful completion of the perpendicularity test if a current pattern detected is consistent with the fob being perpendicular to the vehicle.

15. The method of claim 9 further comprising determining successful completion of the saturation test if a response from the fob to messages communicated from different PES antennas included within the vehicle indicate different signal amplitudes being detected by the fob for messages communicated from two or more of the different PES antennas.

16. A method of preventing relay attack of a passive system (PS) used within a vehicle to provide passive access to one or more vehicle systems, the method comprising:
   upon detecting a PS triggering event, transmitting a PS query message from one or more PS antennas included within the vehicle;

receiving a first response of a fob receiving one or more of the PS query messages, the response indicating a strength of signals used to convey the one or more query messages;

determining whether the fob is one of near field and far field from the vehicle based on the strength of the signals;

creating a challenge query for the fob that is dependent on whether the fob is near field or far field, the challenge query requesting the fob to differentiate between signals having a first amplitude and signal having second amplitude;

transmitting a challenge query message to the fob to request to fob to differentiation between signals wherein the second amplitude is greater than the first amplitude in the event the fob is far field and wherein the second amplitude is less than the first amplitude in the event the fob is near field; and granting access to the one or more vehicle systems to be passively controlled according to the PS triggering event depending at least in part on a second response indicting the fob differentiated between the signal having the first and second amplitudes.

17. The method of claim 16 further comprising transmitting three PS query messages from three PS antennas and requiring the fob to identifying different signal strengths for at least two of the three PS query messages before granting access to the one or more vehicle systems.

18. The method of claim 16 further comprising transmitting a perpendicularity query message from one of the PS antennas and requiring the fob to identify a current pattern consistent with the fob being perpendicular to the vehicle before granting access to the one or more vehicle systems.

19. The method of claim 16 further comprising transmitting the challenge query from the one of the PS antennas determined to be closest to the fob.

20. The method of claim 19 further comprising determine the PS antenna closest to the fob based on triangulating three response messages transmitted from the fob in response to receipt of three PS query messages.

* * * * *

UNITED STATES PATENT AND TRADEMARK OFFICE
CERTIFICATE OF CORRECTION

PATENT NO. : 8,587,403 B2
APPLICATION NO. : 12/643189
DATED : November 19, 2013
INVENTOR(S) : Riad Ghabra et al.

Page 1 of 1

It is certified that error appears in the above-identified patent and that said Letters Patent is hereby corrected as shown below:

In the Claims:

Column 12, Line 6, Claim 17:

After "requiring the fob to" delete "identifying" and
Insert -- identify --.

Column 12, Line 17, Claim 20:

After "further comprising" delete "determine" and
Insert -- determining --.

Signed and Sealed this
Thirteenth Day of May, 2014

Michelle K. Lee
*Deputy Director of the United States Patent and Trademark Office*